(12) United States Patent
Parsells et al.

(10) Patent No.: US 6,881,131 B2
(45) Date of Patent: Apr. 19, 2005

(54) METHOD AND APPARATUS FOR DIAMOND WIRE CUTTING OF METAL STRUCTURES

(75) Inventors: Robert Parsells, Princeton, NJ (US); Geoff Gettelfinger, Princeton Junction, NJ (US); Erik Perry, Princeton Junction, NJ (US); Keith Rule, Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 0 days.

(21) Appl. No.: 10/138,792

(22) Filed: May 3, 2002

(65) Prior Publication Data

US 2004/0231654 A1 Nov. 25, 2004

Related U.S. Application Data

(60) Provisional application No. 60/288,519, filed on May 3, 2001.

(51) Int. Cl.[7] .............................................. B24B 1/00
(52) U.S. Cl. ....................... 451/53; 451/449; 451/488; 451/7; 125/56; 125/21; 125/443; 83/651.1
(58) Field of Search .................... 451/53, 449, 488, 451/7; 125/21, 56, 443, 444; 83/651.1, 176, 83/16; 4561/53, 449, 488, 7

(56) References Cited

U.S. PATENT DOCUMENTS

| | | | | |
|---|---|---|---|---|
| 4,016,856 A | * | 4/1977 | McLaughlin | 125/21 |
| 5,297,182 A | * | 3/1994 | Cepkauskas | 376/260 |
| 5,329,562 A | * | 7/1994 | Kubo et al. | 376/260 |
| 5,361,621 A | * | 11/1994 | Anthony et al. | 72/467 |
| 5,605,141 A | * | 2/1997 | Bilotta | 125/16.02 |
| 5,778,869 A | * | 7/1998 | Toyama | 125/16.02 |
| 6,279,564 B1 | * | 8/2001 | Hodsden et al. | 125/21 |
| 6,332,325 B1 | * | 12/2001 | Monfort | 62/62 |

* cited by examiner

*Primary Examiner*—Joseph J. Hail, III
*Assistant Examiner*—Alvin J Grant
(74) *Attorney, Agent, or Firm*—Wolff & Samson PC

(57) ABSTRACT

A method and apparatus for diamond wire cutting of metal structures, such as nuclear reactor vessels, is provided. A diamond wire saw having a plurality of diamond beads with beveled or chamfered edges is provided for sawing into the walls of the metal structure. The diamond wire is guided by a plurality of support structures allowing for a multitude of different cuts. The diamond wire is cleaned and cooled by $CO_2$ during the cutting process to prevent breakage of the wire and provide efficient cutting. Concrete can be provided within the metal structure to enhance cutting efficiency and reduce airborne contaminants. The invention can be remotely controlled to reduce exposure of workers to radioactivity and other hazards.

26 Claims, 5 Drawing Sheets

METHOD AND APPARATUS FOR DIAMOND WIRE CUTTING OF METAL STRUCTURES

RELATED APPLICATIONS

This application claims the benefit of U.S. Provisional Application Ser. No. 60/288,519 filed May 3, 2001, the entire disclosure of which is expressly incorporated herein by reference.

STATEMENT OF GOVERNMENT INTERESTS

This invention was made with government support under U.S. Department of Energy Contract No. DE-AC02-76CH03073. The government has certain rights in this invention.

BACKGROUND OF THE INVENTION

1. Field of the Invention

The present invention relates to the cutting and/or sawing of metal structures. More specifically, the present invention relates to a method and apparatus for diamond wire cutting of complex metal structures, such as nuclear reactor vessels.

2. Related Art

Many complex metal structures, such as nuclear reactor vessels and equipment associated therewith, are required to be quickly and efficiently dismantled during decontamination and decommissioning projects. The dismantling process requires the cutting of large and complex metal components, which are often radioactive, prior to removal from a site. For example, the Tokamak Fusion Test Reactor ("TFTR"), which ceased operation in April of 1997 and was decommissioned in October of 1999, contained radioactive vacuum vessel portions that were contaminated by prior deuterium-tritium experiments and were required to be removed without exposing workers to hazardous levels of radioactivity. Accordingly, the radiological hazards associated with decommissioning, in addition to the large sizes of such vessels (i.e., 80 cubic meters), present significant challenges.

Methods for dismantling such complex metal structures have been attempted in the past, but none have achieved acceptable results. For example, plasma-arc cutting methods are currently employed in decommissioning projects to cut through metals having thicknesses in excess of 0.5 inches, but require workers to enter the reactor in order to effectuate the cuts and remove equipment. This exposes the workers to potentially unacceptable levels of radioactivity. Further, the workers must be fitted with air-supplied bubble suits prior to entering the vessel. Additionally, airborne radioactive contaminants and harmful gases can be released when the metal structures are cut by the plasma-arc torch, requiring expensive containment, filtration, and respiratory systems to abate such dangers.

Diamond wire cutting methods have been employed for more than 25 years in marble and granite mining operations. Diamond-impregnated beads are affixed to a continuous strand of spring or rubber-encapsulated steel wire that is looped onto a drive pulley and driven at a high speed to cut through stone. This method has proven to be an extremely efficient system for nondestructive stone extraction and mining operations, and has even been applied to cut concrete support structures and shielding at various nuclear power plant sites. A particular problem with diamond wire cutting of metal structures, however, lies in the inability to efficiently clean and cool the wire as it passes through the metal structure. Further, the wire can easily snag and break on complex metal structures, and can release radioactive components or other projectiles into the air during use.

Accordingly, what would be advantageous, but has not yet been provided, is a method and apparatus for diamond wire cutting of complex metal structures, such as nuclear reactor vessels, that addresses the aforementioned shortcomings.

SUMMARY OF THE INVENTION

The present invention relates to a method and apparatus for diamond wire cutting of complex metal structures, such as nuclear reactor cores, vacuum vessels, and other equipment associated therewith. The invention comprises a diamond wire saw having beveled diamond beads that provide energy absorption and reduced breakage when the saw is passed through metal structures. An apparatus is provided for cooling and cleaning the saw during use. A guide apparatus may be provided for allowing a variety of cuts into complex metal structures.

The diamond wire is driven by a remotely positioned electric or hydraulic motor. The diamond wire saw of the present invention can be cooled and cleaned by a $CO_2$ blast cleaning and cooling apparatus. Liquid $CO_2$ is fed from a tank to a convergent-divergent nozzle, such as a Venturi nozzle, forming crystalline $CO_2$ particles that are fired at high speed toward the diamond wire. Metal and other particles accumulated on the wire are cleaned therefrom, and the wire is cooled to provide enhanced cutting efficiency. Tension on the wire can be controlled by a torsion control and braking system.

Further, the present invention may use structures having pulleys attached thereto to allow both push and pull cuts to be made into complex metal structures. The pulleys can be attached to upward and downward support arms and can be moved along the arms to facilitate different cutting angles. The pulleys can be electrically driven along the racks and remotely controlled by a joystick controller. The support structure of the present invention can be free-standing, or affixed to structures about the metal structure to be cut.

BRIEF DESCRIPTION OF THE DRAWINGS

These and other important objects and features of the invention will be apparent from the following Detailed Description of the Invention taken in connection with the accompanying drawings in which.

DETAILED DESCRIPTION OF THE INVENTION

The present invention relates to a method and apparatus for diamond wire cutting of complex metal structures, such as nuclear reactor vessels. A diamond wire having beveled or chamfered diamond beads is used to effectuate the cut. The diamond wire is cooled and cleaned during use to allow the wire to cut metal and to prevent breakage of the wire. A variety of cuts, including push and pull cuts, can be effectuated by the present invention.

Figure 1:
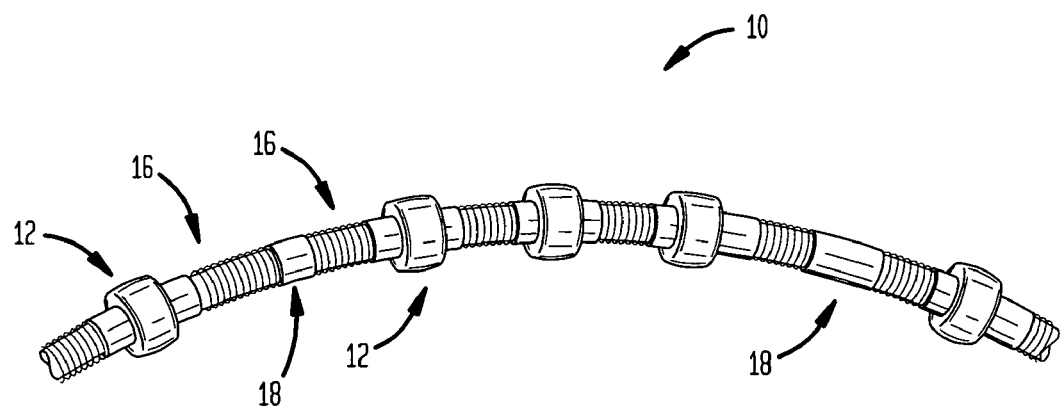
FIG. 1 is a photograph showing a portion of the diamond cutting wire of the present invention.

FIG. 1 is a photograph showing the diamond cutting wire of the present invention. The wire, indicated generally at 10, includes a plurality of diamond-impregnated beads 12 separated by springs 16 and ferrules 18. Each of the beads 12 include beveled or chamfered edges that reduce wear of both the diamonds and the base metal supporting the diamonds, thereby resulting in shorter cutting times and decreased labor costs. The beads are affixed to a continuous strand of spring- or rubber-encapsulated wire, and are driven at high speed through a steel structure to cut same. Multiple sizes of diamond wire rope can be used to effectuate cuts (or "kerfs") of desired thickness. In a preferred embodiment of the present invention, wire 10 is a spring-encapsulated wire having a diameter of 10 mm or smaller. It is to be understood, however, that other wire or bead diameters are considered within the scope of the invention. It may be desirable to use a first wire with a first diameter (i.e., 11 mm) and a second wire with a smaller diameter (i.e., 10 mm), which can be used if the first wire needs to be replaced. As the first wire wears, the cut formed thereby decreases. Thus, a second wire of the same diameter as the first wire may not fit into the kerf created by the first wire. Importantly, the wire 10 of the present invention is capable of cutting through a variety of complex metal structures, including graphite plates, stainless steel plates, INCONEL support plates, and various ceramic components.

Figure 2:
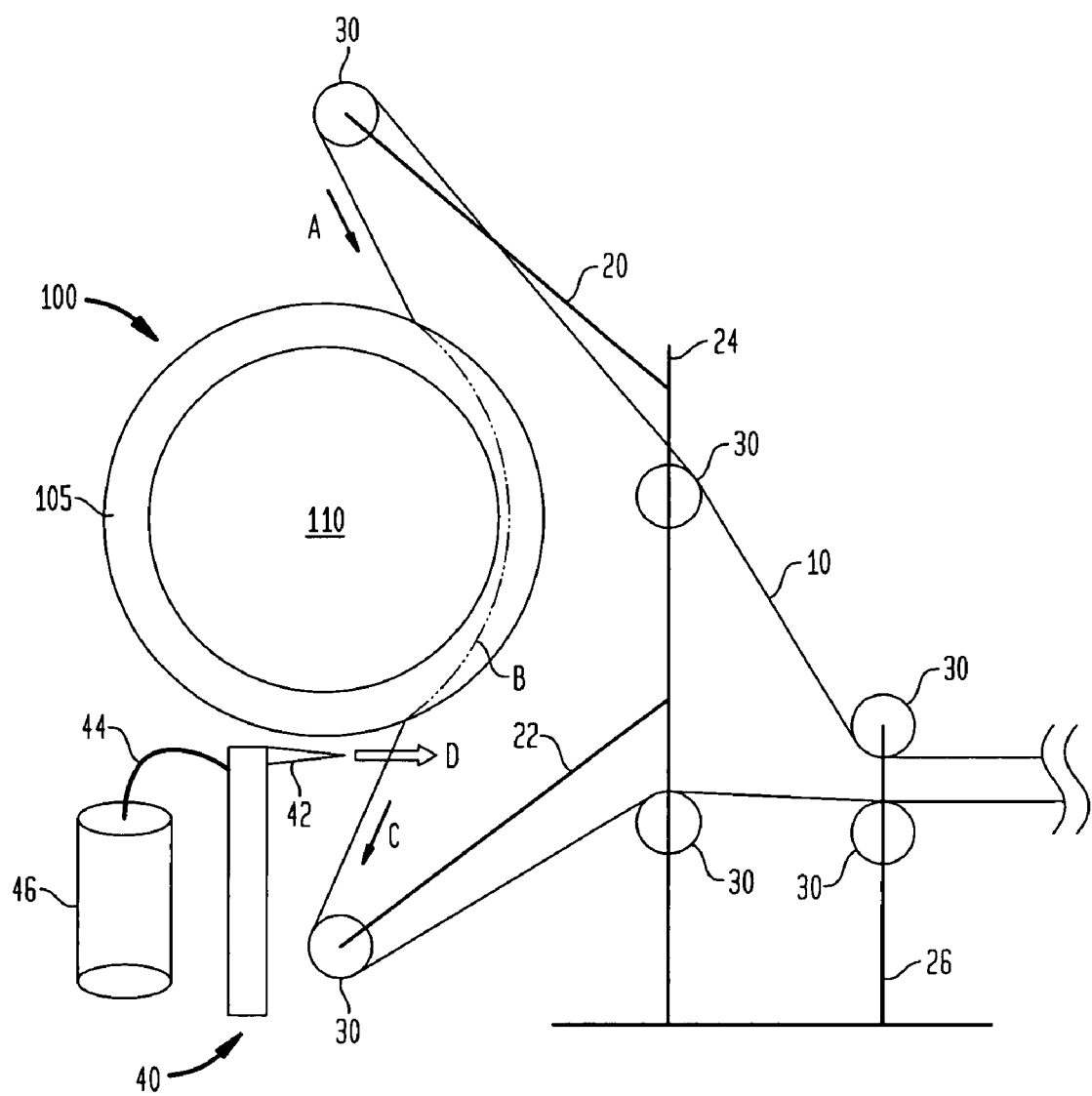
FIG. 2 is a schematic view of the diamond wire cutting apparatus of the present invention.

FIG. 2 is a schematic view showing the apparatus of the present invention. A complex metal structure 100, such as reactor vessel having a wall 105, can be cut with the diamond wire 10 of the present invention. A plurality of support structures 20, 22, 24, and 26 supporting pulleys 30 guide the wire 10 so that a cut can be made through the structure 100. Upward and downward support arms 20 and 22 can be adjusted for accommodating a variety of different structure shapes and for allowing an optimal cut to be made into structure 100. As shown in FIG. 2, the wire 10 can be pushed against an object being cut. Alternatively, the wire 10 can be pulled against the object.

As shown in the drawing, the wire 10 travels along pulleys 30 to cut into wall 105 of structure 100. Wire 10 travels along the general direction indicated by arrow A, and into wall 105, generating a kerf B in wall 105. The wire 10 then exits the wall 105 in the direction indicated by arrow C. The wire 10 is moved by a remotely positioned driving mechanism.

Upon exiting the wall 105 (i.e., after cutting), wire 10 is cleaned and cooled. In a preferred embodiment of the present invention, a cleaning apparatus 40 comprises a $CO_2$ blast cleaning device that fires crystalline $CO_2$ particles at wire 10 at high velocity, removing particles accumulated on the wire 10 as a result of cutting. Nozzle 42 of apparatus 40 can be a convergent-divergent nozzle that is fed from liquid $CO_2$ tank 46 via a dip-tube. Upon exiting the nozzle 42, the liquid $CO_2$ forms a crystalline solid by direct expansion cooling, forming flakes having high velocity that impact the wire 10 and clean it as it passes by nozzle 42. The $CO_2$ also cools the wire 10, thereby increasing the lifespan of wire 10 and efficiency of the cutting process.

In an alternate embodiment of the present invention, cleaning apparatus 40 comprises aspirating pre-formed $CO_2$ pellets into a Venturi nozzle of an air-blasting system. In such an arrangement, the wire 10 can be blast-cleaned and cooled as it exits the wall 105 of structure 100. It is to be understood that any cleaning and/or blast-cleaning or cooling apparatus known in the art can be applied to clean and cool wire 10 without departing from the scope of the present invention. Further, other coolants, such as other cryogenic gases can be utilized to cool the wire 10 of the present invention, and other particulate matter such as sand, could be used to clean the wire. Indeed, the cooling and cleaning steps could be carried out separately with different processing materials. Additionally, the cleaning apparatus 40 can be provided anywhere along wire 10, which can be oriented at any desired position with relation to structure 100 to effectuate any desired cut.

As previously mentioned, reactor cores and other vessels frequently contain radioactive materials that can be dangerous to personnel involved in the decommissioning of such vessels. In order to prevent the release of airborne contaminants during the cutting process, the interior 110 of structure 100 can be filled with concrete. In a preferred embodiment of the present invention, the concrete comprises GEOCELL, a foamed, lightweight concrete manufactured by GEOCELL of Kenilworth, N.J. It is to be understood, however, that any concrete, preferably a low density concrete, can be used without departing from the scope of the present invention. The concrete traps radioactive components, such as tritium, and prevents off-gassing during the cutting process. The concrete cures by a hydration process that also chemically bonds tritium. Further, the concrete provides shielding from gamma radiation and eliminates the void within structure 100 to comply with burial requirements. Additionally, the concrete provides structural stability for wall 105 of structure 100, so that closure of kerf B during the cutting process is avoided, thereby preventing snagging and/or snapping of wire 10 caused by a closing kerf.

In addition to, or instead of, using concrete, a ventilation shroud or other emission control device could be used to help prevent emission of radioactive particles and other airborne contaminants during the cutting process. The shroud would extend from the reactor room and about the wire 10 and driving mechanism, to prevent emission of any particles, contaminants, or gases from wire 10 during operation of the present invention. The containment shroud could be fabricated in accordance with components known in the art, such as with PERMACON and UNISTRUT components. The shroud can be ventilated and connected to a dust collection system (i.e., 3000 ft/minute high-efficiency vacuum) or a 2000 foot/minute high-efficiency particulate ("HEPA") ventilation system. Such setups require minimal worker entry into the cutting area, thereby providing an added degree of safety.

Importantly, the support structures 20, 22, 24 and 26 of the present invention can be automated and/or hydraulically controlled to accommodate a variety of desired cuts. Further, the support structures 20, 22, 24 and 26 can be adjusted to provide a desired tension on wire 10, in order to prevent breakage of the wire and to ensure optimal cutting efficiency. In a preferred embodiment of the present invention, the wire 10 is operated at a speed of 16 to 20 miles per hour under a tension of 150 to 200 pounds. Other tensions and operating speeds are contemplated by the present invention, and may be substituted for various cutting conditions. Additionally, in the case of wire failure and/or breakage, the wire 10 of the present invention can be conveniently crimped outside of the containment area, thereby allowing quick repair and obviating the need to enter the structure 100.

Figure 3:
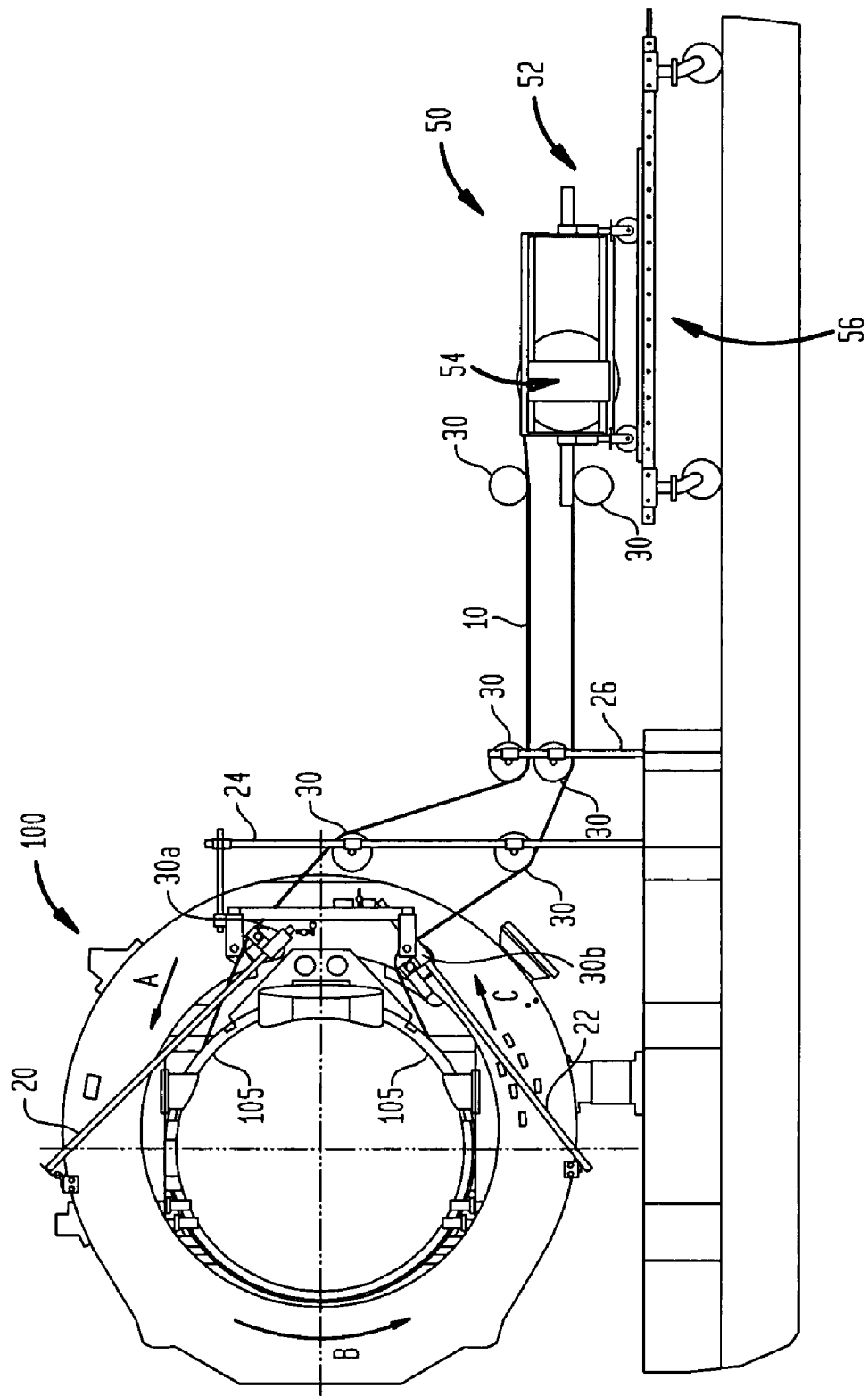
FIG. 3 is a detailed schematic view of the apparatus shown in FIG. 2 wherein the apparatus is configured to make a pull cut.
Figure 4:
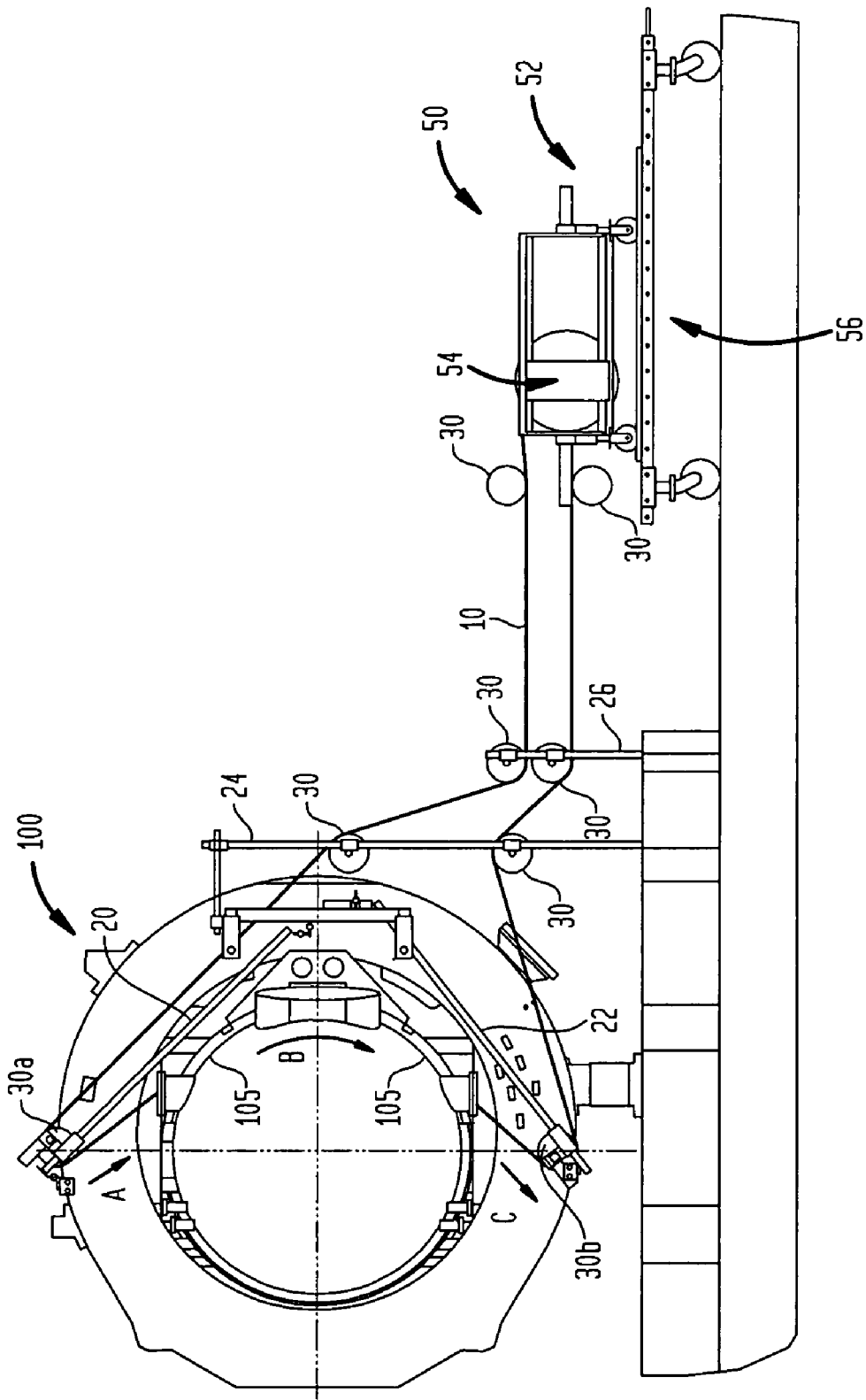
FIG. 4 is a detailed schematic view of an alternate embodiment of the apparatus shown in FIG. 3, wherein the apparatus is configured to make a push cut.

FIGS. 3 and 4 are detailed schematic views of the present invention configured for pull and push cutting, respectively.

As shown in the drawings, wire 10 is positioned in place by support structures 20, 22, 24 and 26, and driven by drive mechanism 50 to cut wall 105 of structure 100. Upward and downward support arms 20 and 22 are oriented so that wire 10 forms a desired cutting angle, and includes pulleys 30a and 30b attached thereto. Pull cuts can be made, as shown in FIG. 3 by wrapping the wire about the structure. The pulleys 30a and 30b are set down on arms 20 and 22. The wire travels over the pulleys 30a and 30b and around the structure in the direction shown by arrows A, B and C.

To provide a push cut, pulleys 30a and 30b are positioned at the ends of arms 20 and 22, away from support structure 24. During the cutting procedure, wire 10 travels past structures 24 and 26, and up toward the top pulley 30a. Then, the wire 10 travels downward along the direction indicated by arrow A toward wall 105 of structure 100, cutting same along the direction indicated by arrow B. The wire 10 then exits the wall 105 along the direction indicated by arrow C, toward bottom pulley 30b of arm 22. The wire then returns past support structures 24 and 26 to drive mechanism 50. Of course, the cutting direction of wire 10 can be reversed, so that the wire 10 exits the wall 105 from the top, as opposed to the bottom, of the structure 100.

To cut a structure, it has been found that use of a combination of pull and push cuts provides the best results. The pulleys 30a and 30b are set preferably set above and below midpoint positions of the structure 100. Support arms 20 and 22 may be mounted to any available structure, or may be freestanding. Indeed, the support arms could even be interconnected with the structure itself. The pulleys are preferably moveably attached to support arms 20 and 22 in a rack and pinion configuration. Movement of the pulleys 30a and 30b along the support arms 20 and 22 are preferably done by remote control using an electric motor with a joystick controller. After a first cut is made, the top pulley 30a of arm 20 can be backed off to reduce the angle of the edge of the structure encountered by the wire. It has been found that moving the pulley to a position 75% radially inward of structure 100 maintains the angle encountered by the wire at less than 90 degrees. This allows the bottom of the second third of the structure to be cut. The top pulley 30a is then extended up arm 20 and the bottom pulley 30b backed off to cut the top of the second third. The final third is then preferably cut using push cutting.

Any combination of push and pull cuts can be utilized to cut a desired metal structure. For example, for cylindrical structures, the first ½ to ⅓ diameter of the structure can be cut using the pull technique. Then, the remaining ⅓ to ½ can be cut using the push technique. The cutting methodologies disclosed for the "pull" and "push" cuts of the present invention are illustrative in nature, and are not intended to limit the scope of the present invention. Conceivably, any desired orientation of wire 10 and support structures 20–26 can be provided for achieving any desired cut.

The driving mechanism 50, shown in FIGS. 3 and 4, drivers the diamond wire 10 of the present invention. Driving mechanism 50 comprises a moveable trolley 56, which can be positioned at any desired location remote from structure 100, and a motor 54 attached to a guide frame 52. The motor 54 can be any type of motor, such as an electric or hydraulic motor, that provides sufficient power to drive wire 10 via a drive wheel or other means. Guide frame 52 allows motor 54 to freely move in a horizontal direction, so that various desired tensions on wire 10 can be provided.

Optionally, driving mechanism 50 can include a number of additional components for providing added features. For example, a tachometer can be provided for measuring the angular velocity of the drive wheel of driving mechanism 50, and hydraulic power unit controls can be provided for changing the velocity thereof. A slip clutch can be provided and coupled with motor 54 to minimize and/or prevent breakage and/or coupling failure of wire 10, and can be set to release pressure at any desired threshold, such as at 300 foot-pounds of force. Further, a load cell or weight stack can be provided to adjust tension on wire 10 and optimize cutting performance. Additionally, an electromagnet can be incorporated into the weight stack to remove power to the motor 54 and/or tension on wire 10 when a slip occurs. Further, an optical pyrometer may be provided for measuring the temperature of the diamond wire 10 during cutting. The output of such a device could then be used to control delivery of $CO_2$ or other cooling and cleaning agent from cleaning apparatus 40.

Figure 5:
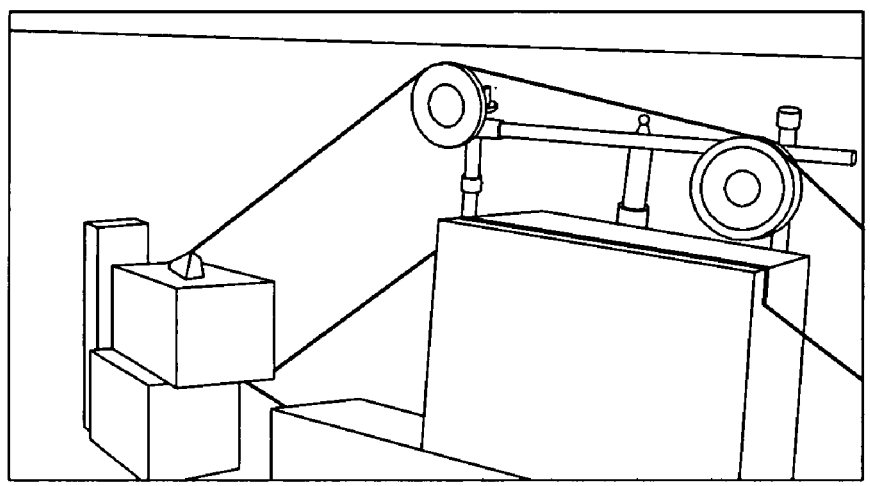
FIG. 5 is a photograph showing a test reactor vessel segment filled with concrete being cut by the apparatus of the present invention.

FIG. 5 is a photograph showing the test reactor vessel segment filled with concrete and being cut by the apparatus of the present invention. The coil segment of the reactor was filled with concrete, and cut using the pull method of the present invention. It was observed that the presence of concrete in the test segment reduced kerf closing and snagging of the diamond wire. Additionally, it was observed that the concrete operated as a cleaning agent, in that the presence of stainless steel on the diamond wire after cutting was significantly reduced. Further, it was observed that plating stainless steel onto the diamond beads was reduced when concrete was present in the test segment.

The present invention was successfully applied during the decommissioning of the vacuum vessel of the Tokamak Fusion Test Reactor. The vacuum vessel was filled with GEOCELL concrete, pumped in three successive events with at least 24 hours of cure time between lifts. A total of 100 cubic yards of concrete was added with an average density of 50 lbs/ft$^3$. The automated pulley system of the present invention was then installed at selected locations for cutting, and particulate collection shrouds and associated apparatus were provided. The main containment and saw containment were installed, sealed, and joined. A cryogenic cooling system ($CO_2$) was positioned to cool and clean the diamond wire. An 11 mm diameter diamond wire was used to perform most of the cutting. A 10 mm wire was also utilized due to bead wear and kerf catching of the 11 mm wire.

A total of 10 cuts were performed on the reactor vessel, each of which lasted approximately 15 hours in duration. The pull cut method was utilized for the majority of cutting, while the push cut method was utilized to complete the cut and free the segments. A minimal number of entries into the containment were necessary to correct instances of wire failure. The entire Tokamak Fusion Test Reactor vessel was cut and removed in a period of approximately 6 months, utilizing the present invention.

Having thus described the invention in detail, it is to be understood that the foregoing description is not intended to limit the spirit and scope thereof. What is desired to be protected by Letters Patent is set forth in the appended claims.

What is claimed is:

1. An apparatus for cutting metal structures comprising:
   a diamond cutting wire;
   means for driving the diamond cutting wire along a metal structure to be cut; and
   means for cooling and cleaning the diamond cutting wire by delivering a cold particulate material to the diamond cutting wire.

2. The apparatus of claim 1, wherein the cold particulate material comprises $CO_2$.

3. The apparatus of claim 2, wherein the means for cooling and cleaning the diamond cutting wire comprises a nozzle for aspirating the cold particulate material prior to delivery.

4. The apparatus of claim 3, wherein the nozzle further comprises a Venturi nozzle.

5. The apparatus of claim 1, further comprising means for measuring temperature of the diamond wire.

6. The apparatus of claim 1, further comprising means for containing airborne contaminants during cutting.

7. The apparatus of claim 1, further comprising means for controlling tension on the diamond wire.

8. The apparatus of claim 1, further comprising a support structure having pulleys for supporting the diamond wire.

9. The apparatus of claim 8, wherein the support structure comprises an upper support arm and a lower support arm for positioning the diamond wire around a portion of the metal structure to be cut.

10. The apparatus of claim 9, wherein the diamond wire is pushed into the metal structure and away from the means for driving by the support arms during cutting.

11. The apparatus of claim 9, wherein the diamond wire is pulled into the metal structure and toward the means for driving by the support arms during cutting.

12. The apparatus of claim 9, wherein the support structure is anchored to the metal structure.

13. The apparatus of claim 9, wherein the pulleys are mounted on and moveable along the support arms.

14. The apparatus of claim 13, wherein the apparatus further comprise means for driving the pulleys along the support arms.

15. The apparatus of claim 14 wherein the means for driving the pulley along the support arms is remotely operable.

16. A method for cutting metal structures comprising:
    positioning a diamond cutting wire about a metal structure to be cut;
    driving the diamond cutting wire along the metal structure to cut the metal structure; and
    blasting the diamond cutting wire with a cold particulate material to clean and cool the diamond cutting wire.

17. The method of claim 16, wherein the step of blasting the diamond cutting wire comprises blasting the diamond cutting wire with $CO_2$ to cool and clean the diamond cutting wire.

18. The method of claim 16, further comprising pulling the diamond cutting wire into the metal structure using upper and lower support arms.

19. The method of claim 16, further comprising pushing the diamond cutting wire into the metal structure using upper and lower support arms.

20. The method of claim 16, further comprising filling the metal structure with concrete prior to cutting.

21. The method of claim 16, further comprising:
    sensing temperature of the diamond wire during cutting; and
    adjusting cooling blasts on the diamond wire in response to the sensed temperature.

22. The method of claim 16, further comprising remotely controlling the diamond wire.

23. The method of claim 16, further comprising containing airborne contaminants during cutting of the metal structure.

24. The method of claim 16, further comprising supporting the diamond cutting wire with a plurality of support structures having pulleys.

25. The method of claim 24, further comprising:
    after a first cut, re-positioning the plurality of support structures to provide a new cutting angle; and
    resuming cutting the metal structure at the new cutting angle.

26. The method of claim 25 further comprising cutting about one half to two thirds of the metal structure using pull cutting and cutting the remainder using push cutting.

* * * * *